United States Patent [19]

Wiebe

[11] Patent Number: 4,575,005
[45] Date of Patent: Mar. 11, 1986

[54] HOSE ARRANGEMENT FOR A CAR WASH

[76] Inventor: Jacob R. Wiebe, 125 Eastwood Dr., Winnipeg, Manitoba, Canada, R2E 0C7

[21] Appl. No.: 587,511

[22] Filed: Mar. 8, 1984

[51] Int. Cl.[4] .............................................. B05B 15/08
[52] U.S. Cl. ................... 239/195; 137/615; 239/588
[58] Field of Search ............... 239/195, 588, 582, 159; 137/615

[56] References Cited

U.S. PATENT DOCUMENTS

| 555,147 | 2/1896 | Burck | 239/588 |
|---|---|---|---|
| 3,265,087 | 8/1966 | Livingston | 239/588 X |
| 3,356,102 | 12/1967 | Johnson | 239/588 X |
| 3,451,628 | 6/1969 | Kelley | 239/587 |

FOREIGN PATENT DOCUMENTS 346270  4/1931  United Kingdom ................ 239/588

Primary Examiner—Andres Kashnikow
Assistant Examiner—Daniel R. Edelbrock
Attorney, Agent, or Firm—Adrian D. Battison; Stanley G. Ade

[57] ABSTRACT

A hose arrangement for use in a car wash of the type which provides a hose with a spray nozzle on the end and means for mounting the hose for rotation around a central pivot point including a boom which extends away from the pivot point and rotates around the pivot point. The boom is formed of a pair of flexible wires arranged on either side of the central pivot and each having coils at a position intermediate the length so as to allow the wire to flex downwardly out of the horizontal plane when the hose is pulled. The central pivot can be arranged to pivot about an axis at a small angle to the vertical whereby the boom has a lowermost position at one point in its rotation to which it tends to rotate.

15 Claims, 5 Drawing Figures

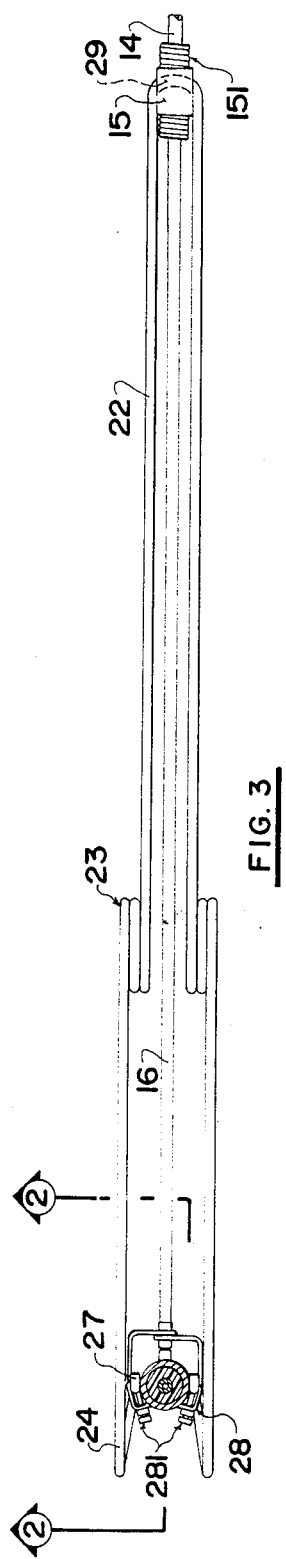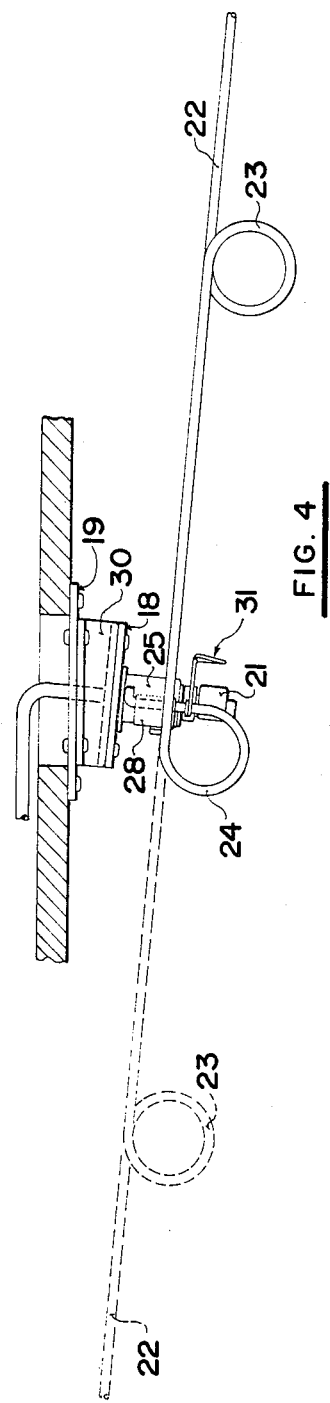
FIG. 3
FIG. 4

HOSE ARRANGEMENT FOR A CAR WASH

BACKGROUND OF THE INVENTION

This invention relates to a hose arrangement for a car wash generally of the type in which a flexible hose extends from a water supply in the ceiling to a wash-spray device with a boom supporting a portion of the hose for rotation in a horizontal plane.

Normally the boom of such an arrangement comprises a rigid pipe section rotatably mounted on a hub adjacent the water supply.

SUMMARY OF THE INVENTION

It is one object of the invention to provide an improved hose arrangement of this type.

Accordingly, the invention provides a hose arrangement for use in a car wash comprising a flexible hose, a wash-spray device on one end of the hose, a water supply device for attachment to the other end of the hose, a boom for supporting a substantially horizontal portion of the hose, means providing a rotatable coupling between the supply device and the hose so that the horizontal portion of the hose can rotate about a vertical axis in a horizontal plane with the remainder of the hose extending downwardly from the horizontal plane, and means for mounting the boom for rotation about the axis, at least a portion of the boom being formed by a flexible wire which can flex to allow the horizontal portion of the hose to be drawn downwardly out of the horizontal plane.

This invention has a number of advantages. Firstly, the boom can be pulled down vertically under tension out of the horizontal plane such as by pulling the end of the hose downwardly. This is specifically beneficial when a car hooks by accident the end of the hose to the bumper or other part of the car when leaving the car wash area. In this circumstance, the boom will be pulled down out of the horizontal plane under, for example, 20 to 30 lbs. tension and thus give the driver a chance to realize that something is wrong before he proceeds and tears down the entire apparatus or removes the hooked part from his car.

Secondly, the flexible wire boom also prevents children from swinging in the car wash bay by holding onto the end of the hose which could cause damage to themselves or to the equipment.

Thirdly, the boom can be manufactured of very light weight in place of heavy conventional solid pipe. With a solid pipe, 50 lbs. of tension at 5 feet from the base hub represents 250 lbs. of weight at the hub. Therefore, the boom and hub have to be sufficiently strong to support weights of this magnitude. In contrast, the arrangement of the present invention simply comes down out of the horizontal plane under tensions of 20 to 30 lbs. and therefore represents very little added weight at the hub.

In view of the greatly reduced forces, the strength and therefore size of the boom and the hub can be very much reduced. The boom arrangement of the present invention can weigh of the order of 50% of the conventional arrangement.

The light weight and reduced forces of the boom enables the boom hub and also the swivel coupling for the hose to be mounted on a single axle. Particularly advantageously, the axle can be provided by a vertical tube or conduit supplying the water to the hose with a collar surrounding the tube and connecting the hose to the interior of the tube and with a rotatable hub for the boom being mounted on the tube above the collar.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention in which:

DESCRIPTION OF THE DRAWINGS

FIG. 1A is a view similar to that of FIG. 1 on a smaller scale showing the boom drawn down out of the horizontal plane.

FIG. 3 is a plan view of the apparatus of FIG. 1.

FIG. 4 is a side elevational view similar to FIG. 1 of a modified arrangement.

In the drawings like characters of reference indicate corresponding parts in the different figures.

DETAILED DESCRIPTION

Figure 1:
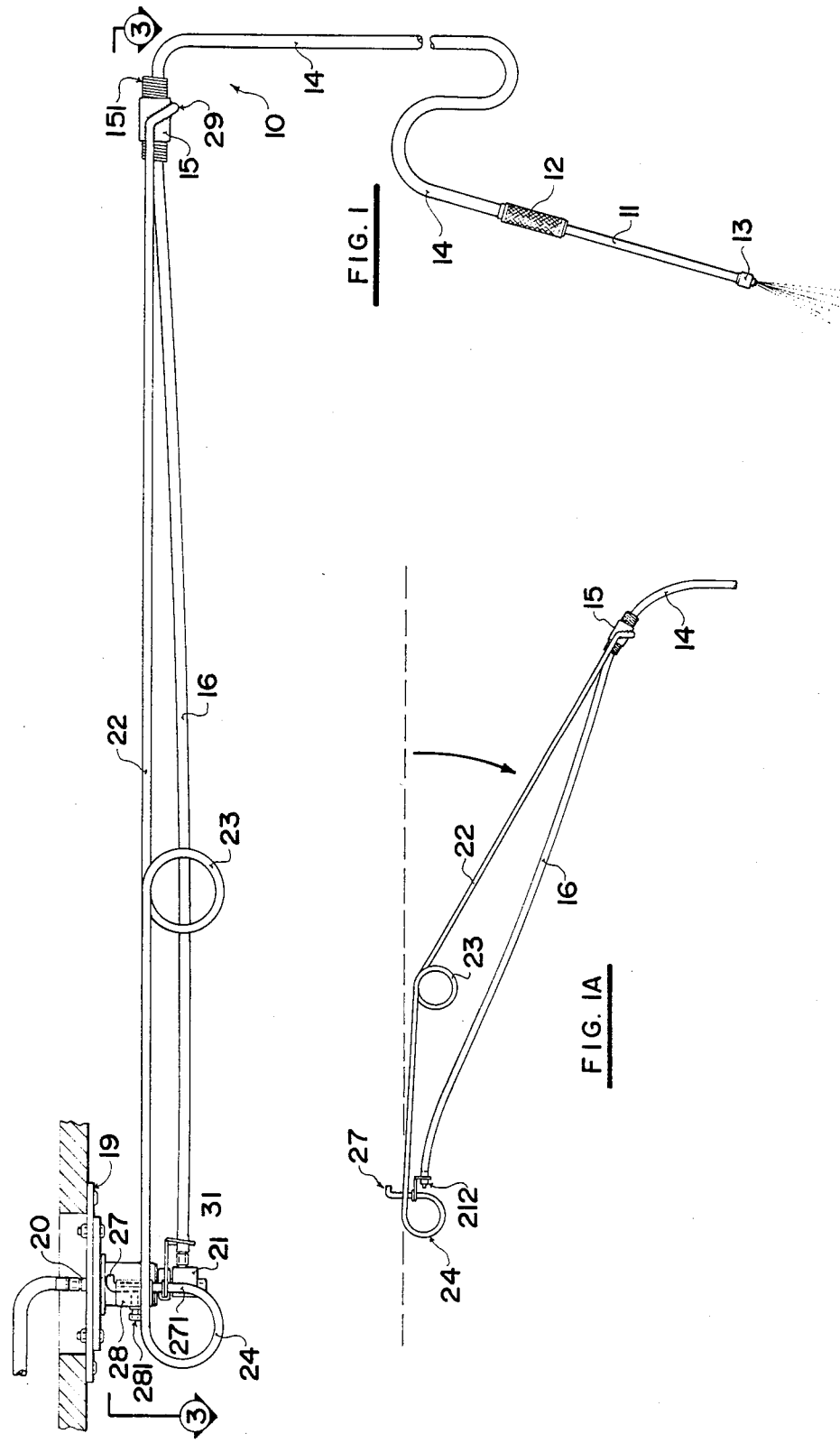
FIG. 1 is a side elevational view of a boom and hose arrangement showing the boom supporting the hose in the horizontal plane.

The hose arrangement for a car wash comprises a hose generally indicated at 10 and comprising a first wand section 11 having a handle 12 and spray nozzle 13. The wand is generally a rigid structure so that the spray nozzle 13 can be directed to whatever position desired.

Connected to the wand by conventional hose coupling is a flexible hose portion 14 which provides sufficient length for the wand to be moved to various desired locations while the end of the section 14 remote from the wand remains in a horizontal plane generally adjacent the ceiling or above the level of the bay in which the car wash is positioned. The flexible section 14 passes through a spring support 15 which includes a coil spring 151 which can flex to accommodate a change in angle of the hose at the support 15. A substantially horizontal further flexible section of the hose 16 extends from the spring support 15 to a central water supply device at the end of the flexible section 16.

The water supply device comprises a tube 17 which is attached to a plate 18 through which it passes at right angles thereto. The plate 18 can be secured to a ceiling or other support indicated at 19 by suitable bolts so as to maintain the tube 17 in a vertical orientation. The tube 17 is rigidly attached to the plate 18 by welding or other suitable technique so that the tube can withstand the transverse forces involved without bending or breaking away from the plate 18.

The upper end of the tube 17 extends beyond the plate 18 to a female screw coupling 20 for receiving the end including a male screw coupling of a hose for providing a water supply to the hose 16.

The tube 17 is formed in two parts with a first upper section 171 which is free from openings in its periphery and a second section 172 connected to the section 171 by a male screw thread portion 174 on the section 172 which cooperates with a corresponding female screw thread portion inside the end of the section 171. To enable the portions to be screwed together, the portion 172 includes a hex nut arrangement 173 on the end remote from the male screw thread coupling which is indicated at 174.

The end of the portion 172 is closed and two transverse openings arranged diametrically opposite are provided in the peripheral wall of the portion 172.

A collar 21 surrounds the lower section 172 of the tube 17 and is mounted thereon using conventional bearing and sealing arrangements generally indicated at 211 which allow the collar 21 to rotate relative to the tube 17 but prevent the escape of water from the ends of the collar. An annular groove in the outer periphery of the section 172 provides a space around the tube 17 for receiving water which is then communicated through an outlet coupling 212 into the hose section 16. Thus, the hose section 16 receives water from the supply hose above the tube 17 and also the whole of the hose is free to rotate around the vertical axis provided by the tube 17 so the wand can be moved to various locations centered on the tube 17.

Figure 2:
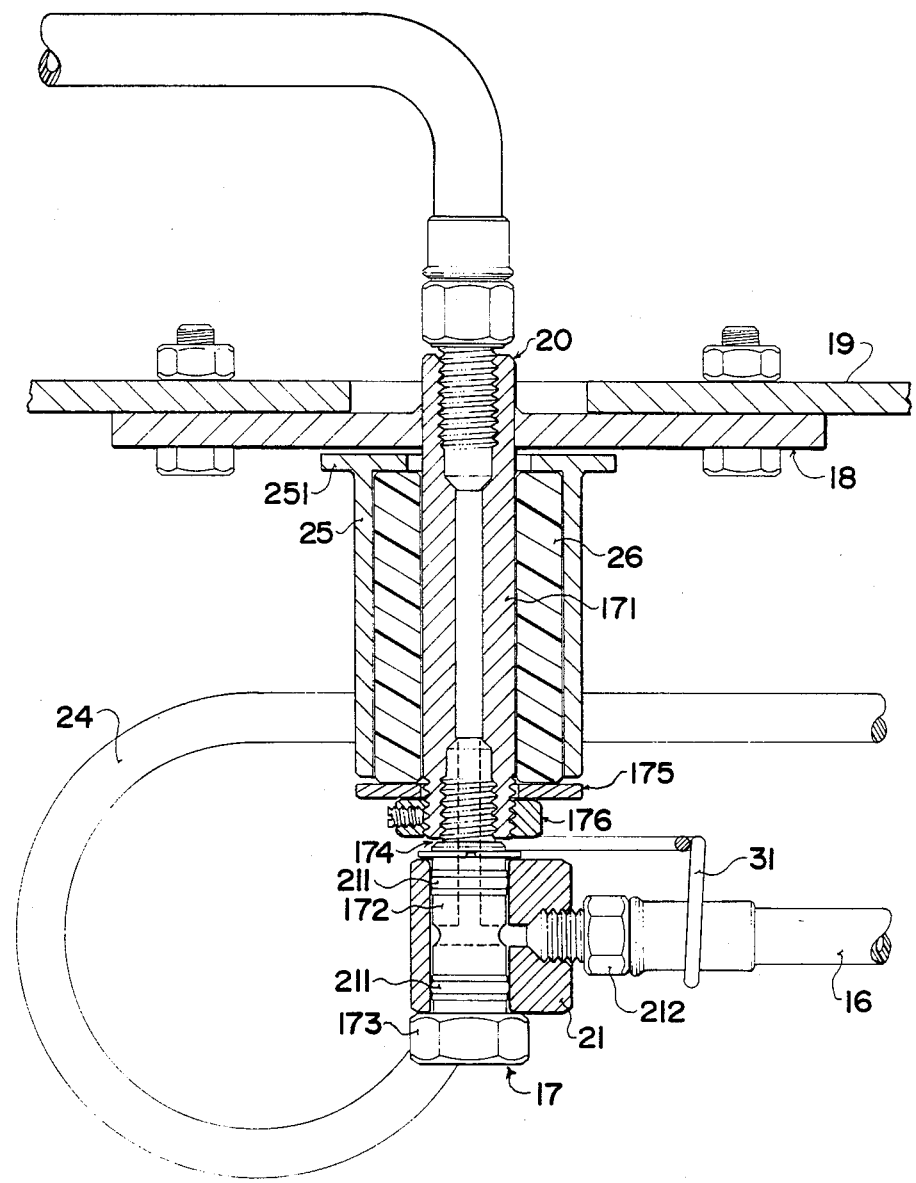
FIG. 2 is a cross sectional view of the apparatus of FIG. 1 showing just the hub area on an enlarged scale, the cross section taken along the lines 2—2 of FIG. 3.

In order to support the section 16 of the hose in a horizontal plane, a boom is provided comprising a pair of spring wire arms 22 and 23, only one of which is visible in the cross sectional view of FIG. 1 and also the side view of FIG. 2. The spring wire arms are formed of gauge wire and are shaped so as to provide a 720° loop at an intermediate position along the length and also a 270° loop at the end adjacent the water supply tube 17. The loops are indicated at 23 and 24 respectively.

The end loop 24 is attached to a hub 25 which is mounted for rotation on a bearing 26 carried on the outer surface of the tube 17. The end of each of the wires terminates from the loop 24 in an upward direction with a slight turned-over section 27. The upward portion is received within a channel 28 provided on the outer surface of the hub 25 and is held in place by engagement of the turned-over 20, section with the end of the channel 28 and by a bolt 281. The width of the channel is sufficient to allow the turned-over section 27 to pass through the channel, with the bolt 281 closing part of the channel to prevent such movement. The loop 24 then turns rearwardly and over to project forwardly wardly across the horizontal plane to the spring support 15 by, for example, welding on the sides and under surface with a turned-down section 29 at the end which is continuously connected to the wire from the opposite side as shown in FIG. 3.

It will be noted that with the tube 17 formed in two portions, the first portion 171 can be assembled and then the hub 25 positioned on the section 171 with the bearings 26 held in position by a washer and retaining clip 175, 176 with the latter screwed to the outside of the portion 171. A plate 251 is attached to the end of the hub so as to lie parallel to the plate 18 to provide a bearing surface and to prevent excess bending of the tube 17 in the event of excessive forces being applied to the tube 17.

The wires 22 and 23 are of sufficient strength and resiliency normally to hold the hose section 16 in the horizontal plane or substantially in the horizontal plane so that the hose can rotate about the axis of the tube 17 to position the wand 11 at a convenient position for use. However, should the wand be pulled beyond the normal forces, the spring wires 22 and 221 bend downwardly out of the horizontal plane without applying excessive additional forces to the tube 17. The flexing of the spring wires 22, 221 occurs firstly at the loop 23 where the two turns of wire provide increased resiliency. When excessive bending occurs this can also be accommodated by the loop 24.

The end 27 is arranged to be of a dimension such that it just is received between the plate 251 and the end of the receiving channel 28 so that it is held in place by the bolt 281. It can be readily removed from the hub 25 by unscrewing the bolt 281 whereupon the end 27 is dimensioned just to slide through the receiving channel 28.

Referring now to FIG. 4, a further improvement is shown in which the mounting plate 18 instead of being connected directly to a horizontal support plate 19, it is coupled to the plate 19 by an intermediate support plate 30 which is bolted to the horizontal support plate 19 at outer sections with a centre section bent out of the plane of the horizontal support plate 19 to define a flat plate at an angle of the order of 5° to the horizontal.

The orientation of the support member 30 is arranged such that it is pointed downwardly toward an angular position at which the boom is intended to park when not in use. Thus, it will be appreciated that with the plate 30 inclined at 5° to the horizontal, the boom itself will similarly incline downwardly toward the parked position.

As shown in phantom, at other positions around the central pivot, the boom is raised from its lowermost position. Therefore, it tends to rotate back to the lower most position when freed at any position other than the lowermost position. In this way, a parked position can be obtained so the boom and wand can be positioned adjacent a coin-operated lock mechanism at which the wand can be parked when the user has finished operation. The angle of 5° has been found to provide sufficient bias of the boom to overcome the resistance in the bearings and particularly the seal bearings of the swivel coupling 21 which provide considerable resistance in view of the necessity to seal against water pressures of the order of 2500 lbs.

A wire loop 31 of finer gauge than the wires 22 is wrapped around the upwardly extending sections 271 of the wires 22 and form a loop around the hose connector 221. This prevents the resistance to rotation of the coupling 21 on the tube 17 from causing the hose to wrap around the tube 21 and forces the coupling 21 to turn with the hub 25.

Since various modifications can be made in my invention as hereinabove described, and many apparently widely different embodiments of same made within the spirit and scope of the claims without departing from such spirit and scope, it is intended that all matter contained in the accompaying specification shall be interpreted as illustrative only and not in a limiting sense.

I claim:

1. A hose arrangement for use in a car wash comprising a flexible hose, a wash-spray device on one end of the hose, a water supply device for attachment to the other end of the hose, a boom for supporting a substantially horizontal portion of the hose, means providing a rotatable coupling between the supply device and the hose so that the horizontal portion of the hose can rotate about a vertical axis in a horizontal plane with the remainder of the hose extending downwardly from the horizontal plane and means for mounting the boom for rotation about the axis, said boom comprising an integral flexible wire which extends from the supply device to an outer end of the horizontal portion of the hose and includes a loop therein rotated through at least 360° arranged such that the wire can bend in a vertical bending plane down from the horizontal plane about an axis defined by said loop, said loop lying substantially in the vertical bending plane of the wire whereby bending of said wire in said vertical bending plane causes torsioning of the loop.

2. A hose arrangement according to claim 1 wherein a second loop is arranged at the end of the wire adjacent the mounting means.

3. A hose arrangement according to claim 1 wherein said loop is arranged at an intermediate position along the length of the wire.

4. A hose arrangement according to claim 1 wherein the water supply device includes a vertical tube and means for rigidly securing the tube to a substantially horizontal support such that the end of the tube protrudes through the horizontal support for connection to a water supply.

5. A hose arrangement according to claim 4 wherein the rotatable coupling means comprises a collar surrounding the tube and having an interior of the collar in water communication with at least one hole in the tube, the collar having bearing and sealing means at each end whereby water is communicated from the tube to the interior of the collar while the collar is free to rotate on the tube.

6. A hose arrangement according to claim 5 wherein the boom mounting means comprises a hub rotatably mounted on the outside of the tube and providing a sleeve for receiving the end of the wire.

7. A hose arrangement according to claim 6 wherein the hub is positioned above the collar.

8. A hose arrangement according to claim 7 wherein the hub includes a plate across the upper surface thereof parallel to the horizontal support.

9. A hose arrangement according to claim 1 wherein the wash-spray device comprises a rigid wand having a spray nozzle.

10. A hose arrangement for use in a car wash comprising a flexible hose, a wash-spray device on one end of the hose, a water supply device for attachment to the other end of the hose, a boom for supporting a substantially horizontal portion of the hose, means providing a rotatable coupling between the supply device and the hose so that the horizontal portion of the hose can rotate about a vertical axis in a horizontal plane with the remainder of the hose extending downwardly from the horizontal plane and means for mounting the boom for rotation about said vertical axis, said boom comprising a pair of substantially parallel self-supporting wires extending outwardly from said mounting means, means attaching said wires to said hose so said wires extend symmetrically on respective sides of said hose, each wire including a loop rotated through at least 360° arranged such that each wire can bend in vertical bending plane down from the horizontal plane about an axis defined by said loop, each of said loops lying substantially in the vertical bending plane of the respective wire whereby bending of said wires in said vertical bending planes causes torsioning of the loops.

11. A hose arrangement according to claim 10 wherein said loops are spaced outwardly from said mounting means and closer thereto than an opposed end of the boom and wherein a second loop is arranged in each said wire immediately adjacent said mounting means.

12. A hose arrangement according to claim 11 wherein an end of each wire adjacent the mounting means is arranged in a vertical direction for attachment to the mounting means and wherein said second loops pass through substantially 270°.

13. A hose arrangement according to claim 10 wherein the wires are interconnected at an end thereof remote from the mounting means.

14. A hose arrangement according to claim 10 wherein the loops pass through 720°.

15. A hose arrangement according to claim 10 wherein one of said wires has its said loop coiled in one direction and the other of said wires has its said loop coiled in the other direction and arranged whereby bending of said wires causes tightening of said loops of both wires.

* * * * *